United States Patent [19]

Röhm

[11] Patent Number: 4,955,623
[45] Date of Patent: Sep. 11, 1990

[54] SELF-TIGHTENING AND LOCKABLE HAMMER-DRILL CHUCK

[76] Inventor: Günter H. Röhm, Heinrich-Röhm-Strasse 50, D-7927 Sontheim, Fed. Rep. of Germany

[21] Appl. No.: 429,843

[22] Filed: Oct. 31, 1989

[30] Foreign Application Priority Data

Apr. 29, 1989 [DE] Fed. Rep. of Germany ....... 3914311

[51] Int. Cl.$^5$ .............................................. B23B 31/10
[52] U.S. Cl. ......................................... 279/60; 279/63
[58] Field of Search ....................... 279/60, 61, 62, 63, 279/64

[56] References Cited

U.S. PATENT DOCUMENTS

| | | | |
|---|---|---|---|
| 3,506,277 | 4/1970 | Harms | 279/63 |
| 3,545,776 | 12/1970 | Haviland | 279/63 |
| 4,836,563 | 6/1989 | Rohm | 279/63 |

FOREIGN PATENT DOCUMENTS 3432918  3/1986  Fed. Rep. of Germany .

*Primary Examiner*—Daniel W. Howell
*Attorney, Agent, or Firm*—Herbert Dubno; Andrew Wilford

[57] ABSTRACT

A drill chuck has a chuck body, a sleeve rotatable but axially nondisplaceable on the chuck body, and a plurality of jaws engaged between the sleeve and chuck body. Angled guides and a screwthread formed on the body, sleeve, and jaws radially displace the jaws toward each other on relative rotation of the sleeve and chuck body in a tightening direction. The sleeve and an axially displaceable locking-ring body have axially interengageable teeth that inhibit angular movement of the ring body and sleeve about the axis only in a front locking position of the ring. A projection is fixed in and extends radially from one of the bodies toward the other body which is formed with an angularly extending slot having angularly opposed and spaced end surfaces spaced apart angularly by a distance greater than the angular dimension of the projection and axially opposed and spaced side surfaces spaced axially by a distance generally equal to the axial dimension of the projection. An axially backwardly extending cutout opens axially forward into the slot adjacent one of the end surfaces thereof at a mouth having an angular dimension generally equal to the axial dimension of the projection.

11 Claims, 3 Drawing Sheets

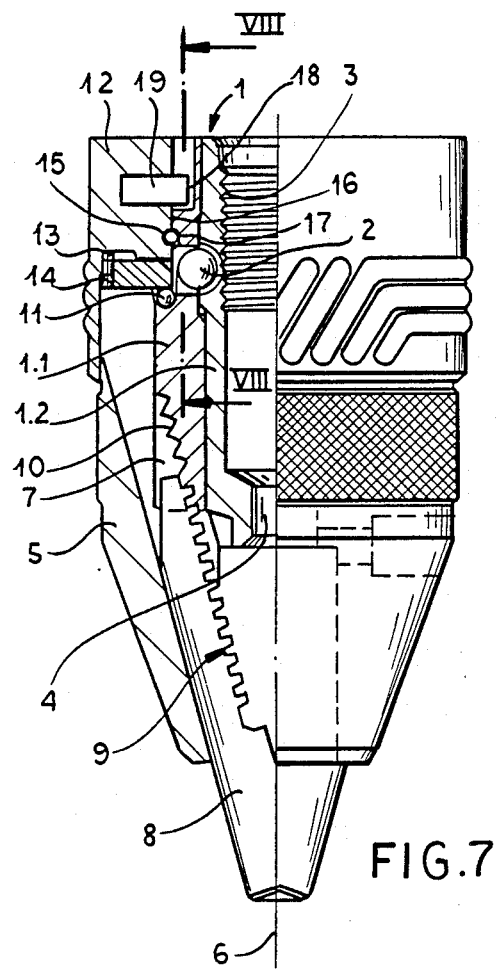
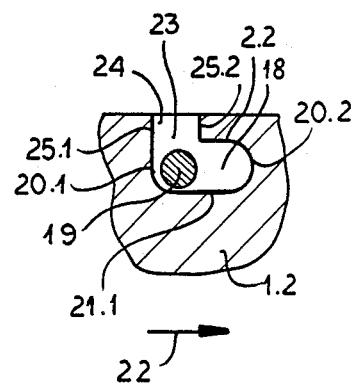

SELF-TIGHTENING AND LOCKABLE HAMMER-DRILL CHUCK

FIELD OF THE INVENTION

The present invention relates to a drill chuck. More particularly this invention concerns a self-tightening hammer-drill chuck.

BACKGROUND OF THE INVENTION

A standard self-tightening hammer-drill chuck that is rotated about an axis of a drill spindle to rotate a drill bit about and reciprocate it along the axis has a chuck body securable to the spindle and formed centered on the axis with a screwthread. A sleeve rotatable but axially nondisplaceable on the chuck body is formed angularly equispaced about the axis with a plurality of angled jaw guides, although it is possible to form the guides on the chuck body and the screwthread on the sleeve for the same effect. Respective jaws in the guides have racks that mesh with the screwthread so that rotation of the sleeve body on the chuck body about the axis in a tightening direction moves the jaws radially together and opposite rotation in a loosening direction moves the jaws radially apart. The normal clockwise (seen from behind the tool) rotation of the drill chuck creates reaction forces in the chuck which tend to rotate the sleeve in the tightening direction for automatic self-tightening action.

It is also standard to provide such a chuck with a locking ring that is limitedly angularly displaceable relative to the chuck body. In addition this ring is formed with teeth or other formations that mesh axially with complementary formations on the sleeve and the ring is axially displaceable on the chuck body between a back unlocked position with the formations disengaged and relative rotation of the ring and sleeve possible, and a front position with the formations in mesh and such relative rotation impossible. The function of this ring is to prevent accidental opening of the chuck. The limited angular movement of the ring on the chuck body is necessary to allow the above-described self-tightening action to take place and is created by providing the ring or chuck body with a pin projecting radially into a slot on the other body that is of somewhat greater angular width than the pin.

It is possible as described in U.S. Pat. No. 4,836,563 for the jaws to have teeth directly meshing with a screwhead on the chuck body, or as described in German patent document 3,432,918 the jaws can be guided externally on the sleeve on pushers that themselves are moved by a screwthread. In both cases the locking ring is held by a spring or snap fit in its two axially offset end positions.

With such an arrangement when a drill bit is to be chucked the locking ring is first pulled back, and then the sleeve is rotated in the unlocking direction, normally counter-clockwise as seen from axially behind the chuck, to spread the jaws sufficiently to accept the tool. Then the sleeve is rotated in the locking direction until the jaws snugly engage the shank of the tool, and finally the locking ring is pushed back forward so that its teeth engage those of the sleeve and impede it from rotating substantially on the chuck body.

Thus with the standard system it is entirely possible for the locking ring to be in its angular end position corresponding to engagement of its formation in the locking direction with the chuck body or vice versa, that is in such a position that it completely impedes further tightening of the chuck. When the locking ring is allowed to move back forward into this position after a new tool is fitted to the chuck, the result is that the subsequent automatic self-tightening action is prevented by the locking ring. To avoid this the user must remember before resetting the locking ring to rotate it in the unlocking direction to the extent of its angular travel so that when pushed forward there is still some room for automatic self-tightening of the chuck.

This problem is particularly evident in the system of above-mentioned German No. 3,432,918 when a spring is provided that continuously urges the locking ring in the tightening direction. Even when this spring is not used, as in above-mentioned U.S. Pat. No. 4,836,563, and instead a spring is provided that is effective oppositely, when the force of this spring is overcome as the locking ring is pushed forward it is possible to set it ahead in the locking direction, limiting subsequent self-tightening as with the older prior-art systems. In addition such a system does not work well with small forces, as for instance with a small diameter drill bit.

OBJECTS OF THE INVENTION

It is therefore an object of the present invention to provide an improved self-tightening lockable drill bit.

Another object is the provision of such an improved self-tightening lockable drill bit which overcomes the above-given disadvantages, that is which can be locked but that always will have some play for self-tightening when it is locked.

SUMMARY OF THE INVENTION

A drill chuck according to this invention for rotation about an axis of a drill spindle to rotate a drill bit about and reciprocate it along the axis has a chuck body securable to the spindle, a sleeve rotatable but axially nondisplaceable on the chuck body, and a plurality of jaws engaged between the sleeve and chuck body. Angled guides and a screwthread formed on the body, sleeve, and jaws provide for radial displacement of the jaws toward each other on relative rotation of the sleeve and chuck body in a tightening direction and for radial displacement of the jaws away from one another on opposite relative rotation in a loosening direction. A locking-ring body is axially displaceable between a rear unlocked position and a front locking position on the chuck body. The sleeve and locking-ring body have complementary axially open and projecting formations fittable within each other to inhibit substantial relative angular movement of the ring body and sleeve about the axis only in the front locking position, these formations being out of engagement with one another in the rear unlocked position. A projection is fixed in and extends radially from one of the bodies toward the other body. The other body is formed with an angularly extending slot having angularly opposed and spaced end surfaces spaced apart angularly by a distance greater than the angular dimension of the projection and axially opposed and spaced side surfaces spaced axially by a distance generally equal to the axial dimension of the projection. Thus when the projection is engaged in the slot same limits relative angular displacement of the bodies. An axially backwardly extending cutout opens axially forward into the slot adjacent one of the end surfaces thereof at a mouth having an angular dimension generally equal to the axial dimension of the projection. Thus the cutout only allows axial travel of the locking ring into its locked position when the projection is aligned axially with the cutout at the one end surface of the slot.

Thus with this system the locking ring can only be pushed forward to lock the sleeve and chuck body together at the rear end of the angular travel of the projection in the slot, so that the full length of the slot is available for self-tightening of the chuck while loosening is effectively impeded. The system is simple and foolproof.

According to a feature of this invention the cutout has angularly spaced and axially extending edges forming a guide for the projection and the screwthread is angled such that tightening of the chuck corresponds to movement of the sleeve from the one end of the slot to the opposite end thereof. Furthermore the projection is radially displaceable in the one body and has a chamfered end. The chuck also has a spring braced between the projection and the one body and urging the projection radially toward the other body. The rear side surface of the slot is similarly chamfered so that the pin can be axially displaced from the slot by camming of the pin into the one body by engagement of its chamfered end with the chamfered rear side surface. Thus the locking ring can always be pulled back, regardless of what position it is in, but can only be pushed forward in the rear end of the travel-limiting slot. The edges of the cutout are squared and unchamfered so that the pin cannot be cammed in by engagement with the cutout edges.

In accordance with a further invention feature the chamfered end has a substantially frustoconical surface. In addition the edges of the cutout diverge axially rearward. More particularly one of the cutout edges extends at an angle of about 45° to a plane including the axis and the other cutout edge extends generally parallel to the plane and forms an axial rearward continuation of the one end surface of the slot.

Retaining means is engaged between the sleeve and the locking-ring body for releasably retaining same in the locking and unlocked positions and a spring can be braced between the other body and the projection urging the projection away from the one end surface and thereby tightening the chuck. It is also possible for the chuck body to include an inner part and an outer part with the sleeve and ring body mounted on the outer part. The edges of the cutout can also extend back generally parallel to a plane including the axis.

DESCRIPTION OF THE DRAWING

The above and other objects, features, and advantages will become more readily apparent from the following, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIG. 7 is a view like FIG. 1 of yet another chuck according to the invention; and FIG. 8 is a section taken along line VII—VII of FIG. 7.

SPECIFIC DESCRIPTION

Figure 1:
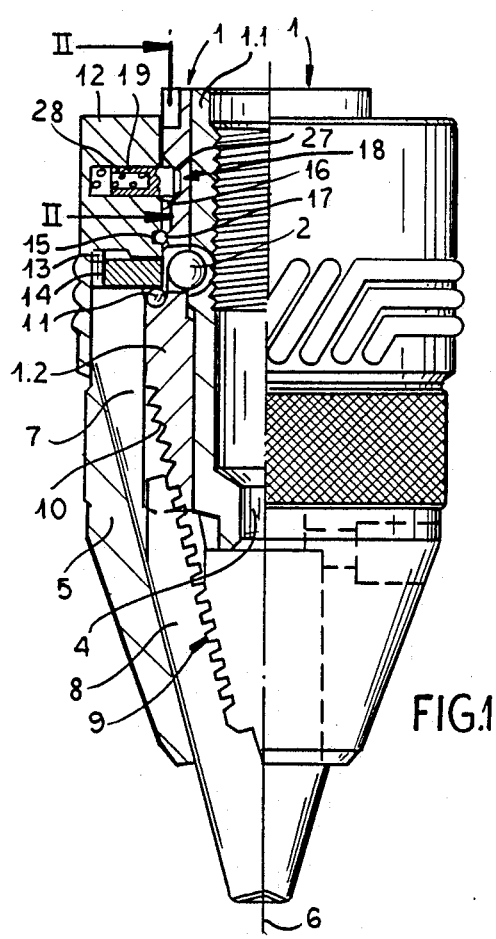
FIG. 1 is a side view partly in axial section of a chuck according to this invention.
Figure 2:
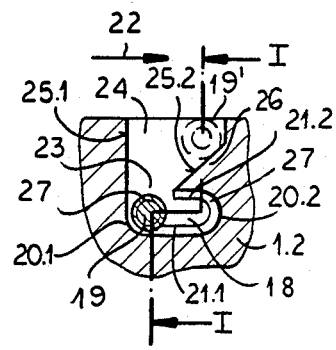
FIG. 2 is a section taken along line II—II of FIG. 1, line I—I of FIG. 2 indicating the section plane of FIG. 1.
Figure 4:
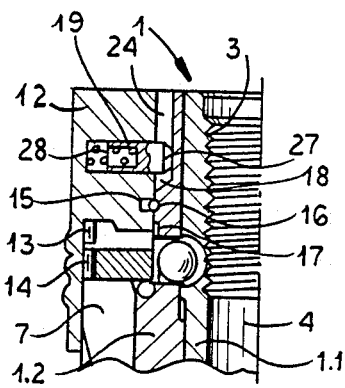
FIG. 4 is a section taken along line IV—IV of FIG. 3.
Figure 3:
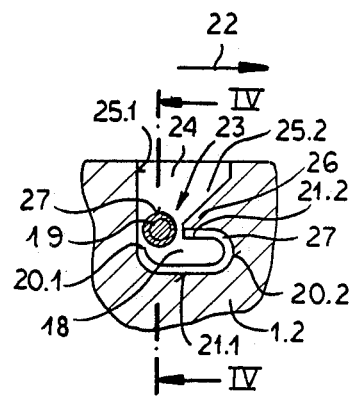
FIG. 3 is a view like FIG. 2 but illustrating the parts in another position.

As seen in FIGS. 1 through 4 a chuck according to this invention has a chuck body 1 comprised of an inner part 1.1 that is formed centered on an axis 6 with a threaded bore 3 that is fitted over a one- or two-piece drill spindle, and an outer part 1.2. The parts 1.1 and 1.2 are rotationally coupled by coupling elements 2, here balls set in radially aligned pockets of the parts 1.1 and 1.2. The bore 3 is extended forward as a passage 4 so that, in the case of a two-part drill spindle, a central hammer rod of this spindle can engage the back of a drill bit held by the chuck.

A tightening sleeve 5 is rotatable but axially nondisplaceable on the outer part 1.2 and is formed with three angularly equispaced angled guides 7 each receiving a respective identical jaw 8 formed along its inner edge with a row of teeth 9 meshable with teeth 10 formed on the outside of the frustoconical lower end of the outer part 1.2 in each guide 7. The sleeve 5 bears axially forward via a roller bearing 11 on an axially backwardly facing shoulder of the part 1.2. The teeth 9 and 10 are angled so that rotation of the sleeve 5 in one direction on the body 1 will move the jaws 8 axially forward (down in FIG. 1) and radially toward each other, and opposite relative rotation will move them axially backward and radially apart. The angle is such that normal clockwise rotation of the drill bit tightens the jaws 8 on the drill bit. The bearing 11 ensures that the reaction forces of tightening the jaws 8 are transmitted from the part 1.2 to the sleeve 5. This self-tightening action is the same when the chuck body 1 is formed of one piece, that is when the two pieces 1.1 and 1.2 are unitary with each other.

A locking ring 12 centered like the sleeve 5 on the axis 6 is angularly displaceable on the chuck between two angularly offset end positions and is also axially limitedly displaceable between a back and a front position. The ring 12 and the sleeve 5 are formed with axially interengageable teeth 13 and 14 that fit together in the front (FIGS. 1 and 2) position of the ring 12 to rotationally lock the sleeve 5 and ring 12 together. In the back position of FIGS. 3 and 4 the teeth 13 and 14 are out of engagement with each other. A spring 15 sitting in a radially inwardly open groove of the sleeve 5 can engage in either of two axially offset and radially outwardly open grooves 16 and 17 of the ring 12 to retain the ring 12 in the respective end positions without inhibiting relative rotation of the ring 12 and part 1.2.

The limits of angular travel of the ring 12 on the part 1.2 are defined by an angularly elongated slot 18 formed in the part 1.2 and a pin 19 projecting radially inward from the ring 12 and engaging in this slot 18. The ends of the slot 18 form abutments 20.1 and 20.2 for the pin 19 so that the relative angular movement is equal to the angular length of the slot 18 minus the diameter of the pin 19. In addition the slot 18 has axially front and back edges 21.1 and 21.2 that limit axial movement of the pin 19, and therefore of the ring 12, when the pin 19 is moved in direction 22 (FIG. 2) into one of its angular end positions which is the self-tightening position. At the opposite end of the slot 18 the part 1.2 is formed with an axially backwardly opening cutout or notch 24 opening into the slot 18 at a mouth 23 and having one surface 25.1 extending axially straight back from the surface 20.1 and another surface 25.2 flaring back at an acute angle from the surface 25.1. Only when the pin 18 is aligned with this cutout 24 can the ring 12 be moved back into the decoupled position of FIGS. 3 and 4. The surface 25.2 ensures that when the locking ring 12 is pushed forward into the engaged position it will be at the end of the slot 18 with the surface 20.1, the part 1.2 being formed with a nose 26 that forces the pin 19 to the side if it is pushed axially forward.

The end of the pin 19 is chamfered at 27 and the notch 23 opens forward, and a spring 28 urges the pin 19 into the slot 18 or cutout 24. The sides of the slot 18 are similarly chamfered so that it is possible to pull the ring 12 back into the release position regardless of the position of the pin 19 in the slot 18, such pulling-back simply forcing the pin 19 in against the force of its spring 28. On the other hand, the flank 25.2 is not similarly chamfered, so that pushing the ring 12 forward when the pin 19 is axially aligned with part of this surface 25.2 will cam the ring 12 angularly back into the unlocked position so that it will enter the unlock end of the slot 18 at the surface 20.1. This ensures that when the chuck is locked the ring 12 always starts at the extreme rear end of its stroke.

Figure 5:
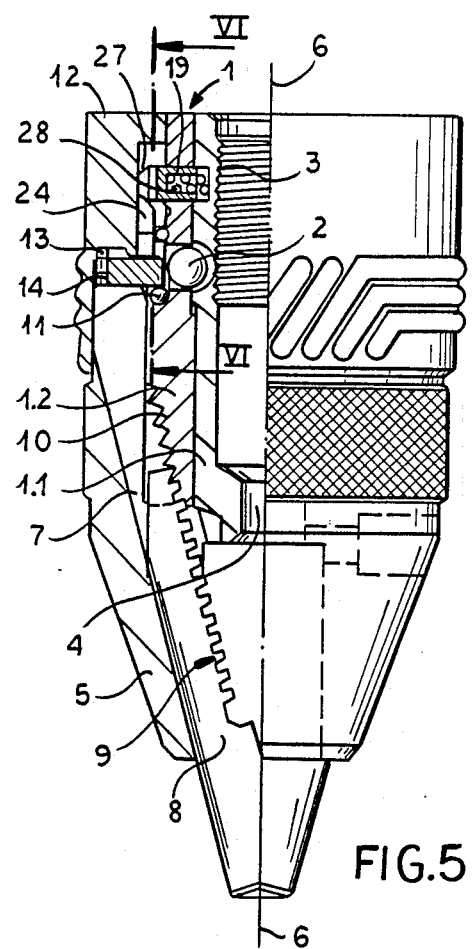
FIG. 5 is a view like FIG. 1 of another chuck according to this invention.
Figure 6:
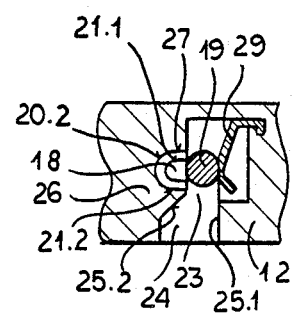
FIG. 6 is a section taken along line VI—VI of FIG. 5.

The system of FIGS. 5 and 6 is identical to that of FIGS. 1 through 4 except that the pin 19 is on the part 1.2 and the slot 18 is formed on the sleeve 5. In addition a spring 29 is provided which urges the pin 19 into the notch 18 into the self-tightening position.

The arrangement of FIGS. 7 and 8 differs from that of FIGS. 1 through 4 in that the pin 19 is fixed and the cutout 24 is straight-sided, only permitting the ring 12 to be pushed forward in the open position of the chuck, that is the ring 12 has to be turned in a direction releasing the drill bit before it can be pulled back and disengaged from the teeth 14 of the sleeve 5.

I claim:

1. A drill chuck for rotation about an axis of a drill spindle to rotate a drill bit about and reciprocate it along the axis, the chuck comprising:
   a chuck body securable to the spindle;
   a sleeve rotatable but axially nondisplaceable on the chuck body;
   a plurality of jaws engaged between the sleeve and chuck body;
   means including angled guides and a screwthread formed on the body, sleeve, and jaws for radial displacement of the jaws toward each other on relative rotation of the sleeve and chuck body in a tightening direction and for radial displacement of the jaws away from one another on opposite relative rotation in a loosening direction;
   a locking-ring body axially displaceable between a rear unlocked position and a front locking position on the chuck body, the sleeve and locking-ring body having complementary axially open and projecting formations fittable within each other to inhibit substantial relative angular movement of the ring body and sleeve about the axis only in the front locking position, the formations being out of engagement with one another in the rear unlocked position; and
   a projection fixed in and extending radially from one of the bodies toward the other body and having predetermined angular and axial dimensions, the other body being formed with
      an angularly extending slot having angularly opposed and spaced end surfaces spaced apart angularly by a distance greater than the angular dimension of the projection and axially opposed and spaced side surfaces spaced axially by a distance generally equal to the axial dimension of the projection, whereby when the projection is engaged in the slot same limits relative angular displacement of the bodies, and
      an axially backwardly extending cutout opening axially forward into the slot adjacent one of the end surfaces thereof at a mouth having an angular dimension generally equal to the axial dimension of the projection, whereby the cutout only allows axial travel of the locking ring into its locked position when the projection is aligned axially with the cutout at the one end surface of the slot.

2. The drill chuck defined in claim 1 wherein the cutout has angularly spaced and axially extending edges forming a guide for the projection.

3. The drill chuck defined in claim 1 wherein the projection is radially displaceable in the one body and has a chamfered end, the chuck further comprising:
   a spring braced between the projection and the one body and urging the projection radially toward the other body; the rear side surface of the slot being chamfered, whereby the pin can be axially displaced from the slot by camming of the pin into the one body by engagement of its chamfered end with the chamfered rear side surface.

4. The drill chuck defined in claim 3 wherein the edges of the cutout are squared and unchamfered, whereby the pin cannot be cammed in by engagement with the cutout edges.

5. The drill chuck defined in claim 3 wherein the chamfered end has a substantially frustoconical surface.

6. The drill chuck defined in claim 1 wherein the edges of the cutout diverge axially rearwardly.

7. The drill chuck defined in claim 5 wherein one of the cutout edges extends at an angle of about 45° to a plane including the axis, the other cutout edge extending generally parallel to the plane and forming an axial rearward continuation of the one end surface of the slot.

8. The drill chuck defined in claim 1, further comprising
   retaining means engaged between the sleeve and the locking-ring body for releasably retaining same in the locking and unlocked positions.

9. The drill chuck defined in claim 1, further comprising
   a spring braced between the other body and the projection urging the projection away from the one end surface and thereby tightening the chuck.

10. The drill chuck defined in claim 1 wherein the chuck body includes an inner part and an outer part, the sleeve and ring body being mounted on the outer part.

11. The drill chuck defined in claim 1 wherein the edges of the cutout extend back generally parallel to a plane including the axis.

* * * * *